G. A. MOORE.
CAPSTAN SCREW.
APPLICATION FILED OCT. 29, 1919.

1,396,455.

Patented Nov. 8, 1921.

Inventor,
George A. Moore;
By
A. B. Upham,
Attorney.

UNITED STATES PATENT OFFICE.

GEORGE A. MOORE, OF MEDFORD, MASSACHUSETTS.

CAPSTAN-SCREW.

1,396,455.  Specification of Letters Patent.  Patented Nov. 8, 1921.

Application filed October 29, 1919. Serial No. 334,233.

*To all whom it may concern:*

Be it known that I, GEORGE A. MOORE, a citizen of the United States, and a resident of Medford, in the county of Middlesex and Commonwealth of Massachusetts, have invented certain new and useful Improvements in Capstan-Screws, of which the following is a full, clear, and exact specification.

August 30, 1910, a patent was granted me for capstan screws, No. 968,783, wherein a brass wire had a head and four radial wings struck up thereon, through the intersection of which wings were formed holes for the operating tool. While this was a success in practically every way, the great expense of brass during the war rendered the screw almost prohibitive in cost. The use of steel was attempted and soon found impossible owing to the constant breakage of the drills employed for forming the holes. I then discovered that by forming the screw with three wings instead of four, the angle between them was made so much flatter as to permit the drills to penetrate with far less danger of breakage, and obtained a patent therefor granted March 11, 1919, No. 1,297,222.

While the latter form of the capstan screw proved less objectionable than the former, manufacture of the same upon a large scale has demonstrated that even the lessened breakage of drills still left an item of expense therefor which in the aggregate amounted to a large sum. Moreover, I have found that the sharpening and renewal of the punches and dies used in shaping the screws entailed an equally large expenditure. This was largely due to the comparatively sharp corners by which the wings were shaped, their easy fracture and difficult sharpening.

In this present invention I have sought to construct a capstan screw which can be struck up with the minimum danger of injury to the dies, and which can also be drilled without breaking the drills.

With these objects in view, I form the screw with a triangular neck or sub-head beneath its circular head, and drill the holes radially inward through the flat faces of the neck.

Figure 1:
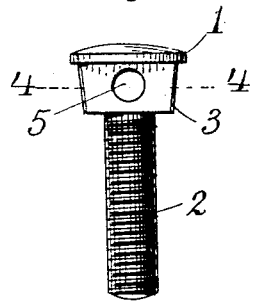
Figure 2:
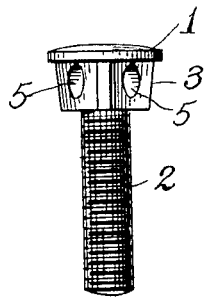
Figure 3:
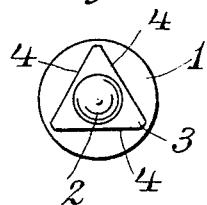
Figure 4:
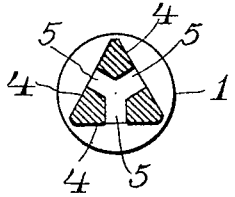
Figure 5:
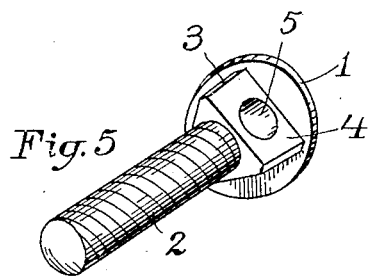

Referring to the drawings forming part of this specification, Figure 1 is an elevation on an enlarged scale of a capstan screw embodying my invention. Fig. 2 is a similar elevation but from a different angle. Fig. 3 is an end view of the screw. Fig. 4 is a cross section on the line 4—4 in Fig. 1. Fig. 5 is a perspective view of the screw.

The reference numeral 1 designates the circular rounded head such as capstan screws are usually provided with; 2 is the threaded section, and 3 is the neck struck up between the head 1 and screw body 2. As shown in Figs. 3 and 4, this neck 3 is in the form of an equilateral triangle. Into each flat face 4 is drilled a hole 5 at right angles thereto, all meeting at a common center.

By thus forming the neck 3 as a solid prism, the stamps and dies are rendered simpler and with less delicate parts to break. Further, the drills are preserved almost wholly from breakage, since they always meet a flat surface at right angles and can penetrate straight into the same. When the wing-forms are drilled, the drill-point is liable to meet one only of the two adjacent wings, instead of squarely at their intersection, and be thereby bent to one side and snapped off. This is occasioned by some imperfection in the forming of the winged capstan screw, so that the jig used for supporting the screw and directing the drill forces the one-sided presentation of the wings and drill.

Further, in the manufacture of my patented forms of screws, it is necessary to swage up the head and die out the wings in two separate operations, but in the production of my new capstan screw both the head and the prismatic neck can be formed in a single operation, thus materially reducing the expense.

Another important feature in my new construction is that the neck can be substantially shorter than the wings of the former screws, thereby rendering it much more pleasing to the piano manufacturers using the same.

What I claim is:

A capstan screw comprising a threaded portion, a head, and a neck between the head and threaded portion, the neck having three equal flat faces composing an equilateral triangle in cross section, each face having a hole formed therein at right angles thereto, these holes meeting at a common center.

In testimony that I claim the foregoing invention, I have hereunto set my hand this 28th day of October, 1919.

GEORGE A. MOORE.